(12) United States Patent
Chen et al.

(10) Patent No.: US 11,138,260 B2
(45) Date of Patent: Oct. 5, 2021

(54) METHOD AND APPARATUS FOR DETERMINING OUTPUT INFORMATION

(71) Applicant: Baidu Online Network Technology (Beijing) Co., Ltd., Beijing (CN)

(72) Inventors: Chaoyang Chen, Beijing (CN); Mengmeng Zhang, Beijing (CN); Wenming Wang, Beijing (CN)

(73) Assignees: Baidu Online Network Technology (Beijing) Co., Ltd., Beijing (CN); SHANGHAI XIAODU TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/684,737

(22) Filed: Nov. 15, 2019

(65) Prior Publication Data
US 2020/0409993 A1 Dec. 31, 2020

(30) Foreign Application Priority Data

Jun. 28, 2019 (CN) .......................... 201910580286.8

(51) Int. Cl.
*G06F 16/635* (2019.01)
*G06F 16/65* (2019.01)
(Continued)

(52) U.S. Cl.
CPC .......... *G06F 16/635* (2019.01); *G06F 16/639* (2019.01); *G06F 16/65* (2019.01); *G06F 16/686* (2019.01)

(58) Field of Classification Search
CPC . G06F 3/16; G06F 3/162; G06F 3/165; G06F 3/167; G06F 16/335; G06F 16/337;
(Continued)

(56) References Cited

U.S. PATENT DOCUMENTS

2004/0210533 A1* 10/2004 Picker .................... H04H 60/06
705/51
2005/0021470 A1* 1/2005 Martin ................. G11B 27/002
705/51
(Continued)

FOREIGN PATENT DOCUMENTS

CN 103995875 A 8/2014
CN 105279262 A 1/2016
(Continued)

OTHER PUBLICATIONS

Kenta Oku, Music Recommendation System—Playlist, Context, and Interaction, Ryukoku University, okukenta@rins.ryukoku.ac.jp, May 13, 2019, 10 pages.
(Continued)

*Primary Examiner* — Andrew C Flanders
(74) *Attorney, Agent, or Firm* — Faegre Drinker Biddle & Reath LLP

(57) ABSTRACT

A method, apparatus for determining output information are provided. The method includes: acquiring at least one history behavior of a user after a first content is output, based on history behavior data of the user; determining a behavior habit of the user after the first content is output, based on the at least one history behavior of the user; and; determining output information for the user in response to the output of the first content, based on the behavior habit of the user. By obtaining different behavior habits corresponding to different users, personalized output information for the users is established.

7 Claims, 2 Drawing Sheets acquiring at least one history behavior of a user after a first content is output, based on history behavior data of the user — S11 determining a behavior habit of the user after the first content is output, based on the at least one history behavior of the user — S12 determining output information for the user in response to the output of the first content, based on the behavior habit of the user — S13

(51) Int. Cl.
*G06F 16/68* (2019.01)
*G06F 16/638* (2019.01)

(58) Field of Classification Search
CPC ........ G06F 16/338; G06F 16/35; G06F 16/38; G06F 16/383; G06F 16/435; G06F 16/436; G06F 16/437; G06F 16/438; G06F 16/4387; G06F 16/4393; G06F 16/48; G06F 16/535; G06F 16/538; G06F 16/55; G06F 16/635; G06F 16/636; G06F 16/637; G06F 16/638; G06F 16/639; G06F 16/65; G06F 16/68; G06F 16/683; G06F 16/686; G06F 16/735; G06F 16/738; G06F 16/739; G06F 16/74; G06F 16/75; G06F 16/78; G06F 16/783; H04N 21/25808; H04N 21/25866; H04N 21/25891; H04N 21/262; H04N 21/16258; H04N 21/2668; H04N 21/44204; H04N 21/44213; H04N 21/44222; H04N 21/4532; H04N 21/4661; H04N 21/475; H04N 21/4755; H04N 21/4756; H04N 21/4825; H04N 21/4826; H04N 2201/3276
See application file for complete search history.

(56) References Cited

U.S. PATENT DOCUMENTS

| | | | | |
|---|---|---|---|---|
| 2006/0195516 | A1* | 8/2006 | Beaupre | G06F 16/637 709/203 |
| 2007/0174147 | A1* | 7/2007 | Klein, Jr. | G06Q 10/087 705/28 |
| 2008/0022208 | A1* | 1/2008 | Morse | G11B 27/105 715/727 |
| 2008/0104106 | A1* | 5/2008 | Rosenberg | G06F 16/686 |
| 2008/0120330 | A1* | 5/2008 | Reed | G06F 16/40 |
| 2011/0231182 | A1* | 9/2011 | Weider | G06F 16/951 704/9 |
| 2014/0257994 | A1* | 9/2014 | Conant | G06Q 30/0272 705/14.66 |
| 2015/0046267 | A1* | 2/2015 | MacTiernan | H04L 51/32 705/14.66 |
| 2015/0248219 | A1* | 9/2015 | Wieder | H04L 67/32 715/716 |
| 2016/0294909 | A1* | 10/2016 | Killick | H04W 4/21 |
| 2018/0157745 | A1* | 6/2018 | Williams | G06F 16/639 |

FOREIGN PATENT DOCUMENTS

| | | |
|---|---|---|
| CN | 106294794 A | 1/2017 |
| CN | 106372116 A | 2/2017 |
| CN | 108540865 A | 9/2018 |
| CN | 108920651 A | 11/2018 |
| CN | 109359217 A | 2/2019 |
| WO | WO2006087891 A1 | 8/2006 |
| WO | WO2018212885 A1 | 11/2018 |

OTHER PUBLICATIONS

Notice of Reasons for Refusal, Japanese Patent Office, Japanese Patent Application No. 2019-203683, dated Jan. 26, 2021, 5 pages (English translation).
First Office Action, The State Intellectual Property Office of People's Republic of China, Application No. 201910580286.8, Baidu Online Network Technology (Beijing) Co., Ltd., dated Dec. 25, 2020, 10 pages (English translation).
Search Report, The State Intellectual Property Office of People's Republic of China, Application No. 201910580286, Baidu Online Network Technology (Beijing) Co., Ltd., dated Dec. 20, 2020, 5 pages (English translation).
State Intellectual Property Office of the People's Republic of China, Notification of the Second Office Action, Application No. 2019105802868, dated Jul. 5, 2021, 6 pages.
China National Intellectual Property Administration, Search Report, Application No. 2019105802868, dated Jun. 28, 2021, 4 pages.

* cited by examiner

METHOD AND APPARATUS FOR DETERMINING OUTPUT INFORMATION

CROSS-REFERENCE TO RELATED APPLICATION

This application claims priority to Chinese Patent Application No. 201910580286.8, filed on Jun. 28, 2019, which is hereby incorporated by reference in its entirety.

TECHNICAL FIELD

The present application relates to the field of information processing technology, and in particular, to a method and apparatus for determining output information.

BACKGROUND

When a content is played for a user through a terminal device, the listened content may be set according to the user's own needs. Moreover, customized or set content can be played for the user through the terminal device. Although users can be provided with contents they request, multiple uncustomized or unset contents as habits are played only if the users request them every time. The habits of different users may be different. Upgrade of the playing for users who have different habits needs to be solved.

SUMMARY

A method and apparatus for determining output information are provided according to embodiments of the present application, to solve one or more technical problems in the existing technology.

In a first aspect, a method for determining output information is provided according to embodiments of the present application, the method includes:

acquiring at least one history behavior of a user after a first content is output, based on history behavior data of the user;

determining a behavior habit of the user after the first content is output, based on the at least one history behavior of the user; and;

determining output information for the user in response to the output of the first content, based on the behavior habit of the user.

In an embodiment, the determining a behavior habit of the user after the first content is output, based on the at least one history behavior of the user, includes:

determining the behavior habit of the user after the first content is output, based on a first history behavior of the at least one history behavior, wherein the first history behavior meets a preset condition, wherein, the preset condition characterizes a history behavior of the user with a play frequency equal to or larger than a preset threshold value.

In an embodiment, after the determining output information for the user, the method further includes:

generating first inquiry information, based on the output information;

wherein the first inquiry information indicates whether the user allows the output information to be played as a fixed play content after the first content is output.

In an embodiment, the method further includes:

playing the first inquiry information in response to a detected output of the first content;

receiving feedback information for the first inquiry information; and playing the fixed play content, in response to the feedback information indicating that the user allows the output information to be played as the fixed play content after the first content is output.

In a second aspect, an apparatus for determining output information is provided according to embodiments of the present application, the apparatus includes:

a data acquiring unit, configured to acquire at least one history behavior of a user after a first content is output, based on the history behavior data of the user;

a processing unit, configured to determine a behavior habit of the user after the first content is output, based on the at least one history behavior of the user; and determine output information for the user in response to the output of the first content, based on the behavior habit of the user.

In an embodiment, the processing unit is configured to determine the behavior habit of the user after the first content is output, based on a first history behavior of the at least one history behavior, wherein the first history behavior meets a preset condition, wherein the preset condition characterizes a history behavior of the user with a play frequency equal to or larger than a preset threshold value.

In an embodiment, the processing unit is configured to generate first inquiry information, based on the output information, wherein the first inquiry information indicates whether the user allows the output information to be played as a fixed play content after the first content is output.

In an embodiment, the apparatus further includes:

an input and output unit, configured to play the first inquiry information in response to a detected output of the first content, and receive feedback information for the first inquiry information, wherein the processing unit is further configured to play the fixed play content, in response to the feedback information indicating that the user allows the output information to be played as the fixed play content after the first content is output.

In a third aspect, an apparatus for determining output information is provided according to embodiments of the present application, the functions of the apparatus may be implemented by hardware or by executing corresponding software through hardware. The hardware or software includes one or more modules corresponding to the functions described above.

In a possible embodiment, an apparatus for determining output information includes a processor and a storage, the storage is configured to store a program for supporting the above method executed by the above device, the processor is configured to execute the program stored in the storage. The apparatus further includes a communication interface configured for communication between the device and another apparatus or communication network.

In a fourth aspect, a computer-readable storage medium is provided for storing computer software instructions used by the apparatus, wherein the computer software instructions include programs involved in execution of the above method.

One of the above technical solutions has the following advantages or beneficial effects:

a user's behavior habit is obtained by analyzing the user's history behavior data, and thus the output information for the user can be determined based on the user's behavior habit. In this way, different behavior habits corresponding to different users can be obtained, and personalized output information can be established for users, so that the users' listening is more in line with their own needs, and the user experience is improved.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals throughout the drawings refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
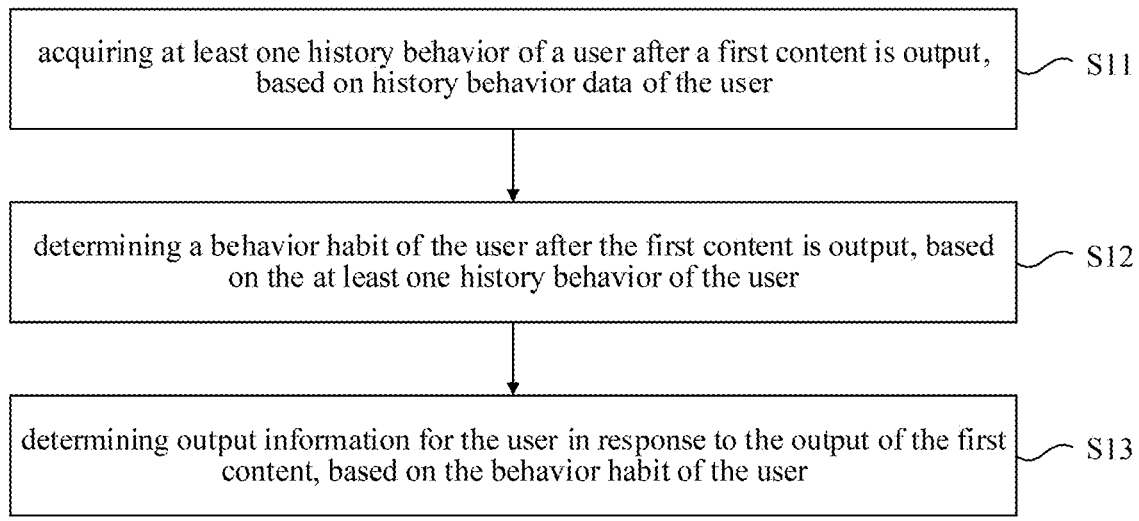
FIG. 1 shows a flow chart of a method for determining output information according to an embodiment of the present application.

In an embodiment, FIG. 1 shows a flow chart of a method for determining output information according to an embodiment of the present application, the method includes:

S11: acquiring at least one history behavior of a user after a first content is output, based on history behavior data of the user;

S12: determining a behavior habit of the user after the first content is output, based on the at least one history behavior of the user; and;

S13: determining output information for the user in response to the output of the first content, based on the behavior habit of the user.

Here, the solution provided by this embodiment can be applied to a device having a processing function, for example, can be applied to a server on the network side; of course, it can also be applied to a terminal device.

When the solution is applied to a server, after determining output information for the user, the terminal device can interact with the user, and the server further determines whether to fix the output information as a behavior habit of the user based on the interaction condition.

In addition, the terminal device corresponding to a target user can be a device capable of performing a voice interaction with the user and performing an audio and/or video output.

In the foregoing S11, the history behavior data can include play history records of a plurality of users. In this embodiment, the processing can be performed separately for each of the users. Therefore, it can be understood that, in the embodiment, the processing is mainly for any one of the plurality of users.

In addition, the history behavior data can specifically be a history play time, a name, a type, a completeness of a history output content of each of the plurality of users, and the like, which will not be specifically defined in this embodiment. Among them, the name of and/or the type of the history output content can be taken as a history behavior.

It should be understood that, in this embodiment, outputting the first content is not limited to playing audio, such as audio novel, music, etc., and can also refer to outputting non-audio information, such as inquiry information, presented information, or clock alarm etc. All of them are within the protection scope of the embodiment, and are not listed exhaustively.

S12 includes: determining the behavior habit of the user after the first content is output, based on a first history behavior of the at least one history behavior, wherein the first history behavior meets a preset condition, and wherein the preset condition characterizes a history behavior of the user with a play frequency equal to or larger than a preset threshold value.

Specifically, the preset condition can be for a period of time or different periods of time in a plurality of stages.

A period of time can be 7 days, or 1 day; different periods of time in a plurality of stages can be 1 day in the first stage, and 7 days in the second stage.

If a preset condition is for a period of time, a preset threshold value can be set for a period of time. A play frequency can be set as a preset threshold value, for example, the play frequency of 5 times within 7 days is set as the preset threshold value.

If the preset condition is for different periods of time in a plurality of stages, different preset threshold values can be set for different periods of time. For example, a period of time corresponding to the first stage may be shorter, 3 days, and the play frequency of 2 times within 3 days is set as the first preset threshold value; the period of time corresponding to the second stage may be longer, 10 days, and the play frequency of 7 times within 10 days is set as the second preset threshold value.

It should be understood that when the preset condition is for multiple stages, respective preset threshold values can be set according to actual conditions, but they are not listed exhaustively in this embodiment.

The aforementioned first history behavior can be understood as a history behavior meeting a preset condition among a plurality of history behaviors.

For example, the plurality of history behaviors are names of a plurality of history output contents, in which history output content 1 and history output content 2 meet the preset condition, a history output content with the highest play frequency is chosen as the first history behavior.

Alternatively, the plurality of history behaviors are types of a plurality of history output contents, in which types 1 and 2 of the history output contents meet the preset condition, a type of a history output content with the highest play frequency is chosen as the first history behavior. For example, after the first content is output, when two types of history behaviors, such as audio novels and music, meet the preset condition, the one with the highest play frequency is chosen as the first history behavior.

In addition, a behavior habit can be determined by: directly setting the first history behavior as the behavior habit of the user after the first content is output. For example, if the first history behavior is playing an audio novel, then the first history behavior can be directly set as the behavior habit of the user after the first content is output.

Alternatively, the type corresponding to the first history behavior is taken as a behavior habit of the user after the first content is output. For example, if the first history behavior is a jazz song, then music such as jazz can be used as a user's behavior habit.

In S13, output information for the user in response to the output of the first content is determined, based on the user's behavior habit. It can be understood that a type or name of a content is determined as the output information, according to the user's behavior habit determined above.

That is, based on the type or name of the play content in the first history behavior, output information is determined.

For example, if the first history behavior is playing an audio novel, then the audio novel can be determined as output information.

If the first history behavior is playing a piano piece, then the output information can be classical music or just piano music.

Furthermore, after the determining output information for the user, the method further includes:

generating first inquiry information, based on the output information, wherein the first inquiry information indicates whether the user allows the output information to be played as a fixed play content after the first content is output.

The method further includes:

playing the first inquiry information in response to a detected output of the first content;

receiving a feedback information for the first inquiry information; and playing the fixed play content, in response to the feedback information indicating that the user allows the output information to be played as the fixed play content after the first content is output.

That is to say, the first inquiry information is generated and is also associated with the user's behavior habit. When the determined fixed play content is the content that the user normally requests after the first content is output, and the first content is output again, the first inquiry information is played.

Further, when receiving the feedback information for the first inquiry information, if the user allows the output information to be played as the fixed play content after the first content is output, the first inquiry information will not be played next time. The output information will be directly played after the first content is output, that is, it will be played as a fixed listening habit for the user.

If the user does not allow the output information to be played as the fixed play content after the first content is output, the fixed play content will not be played and only the first content is output for the user.

Furthermore, if the user does not allow the output information to be played as the fixed play content after the first content is output, the inquiry information corresponding to the output information is deleted, that is to say, within a certain period of time, even if it is detected that the user has requested the fixed play content corresponding to the output information multiple times after the first content is output, playing the fixed play content after the first content is output will not be taken as a behavior habit again for upgrade of the output.

A period of time can be set according to the actual situation, for example, playing the fixed play content after the first content is output will not be taken as a behavior habit for subsequent processing within 10 or 30 days.

In addition, as previously described, upgrade of the output can be performed in multiple stages, that is to say, multiple behavior habits of the user can be obtained in different stages, and different behavior habits may correspond to different output informations. For example, the output information obtained in the first stage is content A; the output information obtained in the second stage is content B. After the first content is output, the content to be played may be: content A+content B.

Here, it should also be noted that the number of pieces of output information may or may not be associated with the number of periods of time.

For example, the associated situation is to avoid the disturbance to the user at night. For example, between 10 PM-8 AM, the number of pieces of output information to be recommended for the user is limited. For example, the first content is a sleeping reminder, then the number of pieces of output information can be limited to no more than two.

It can be seen that, by adopting the above solution, the user's behavior habit can be obtained by analyzing the user's history behavior data, and then the output information for the user is determined according to the user's behavior habit. In this way, different behavior habits corresponding to different users can be obtained, and personalized output information can be established for the users, so that the users' listening is more in line with their own requirements, and the user experience is improved.

Figure 2:
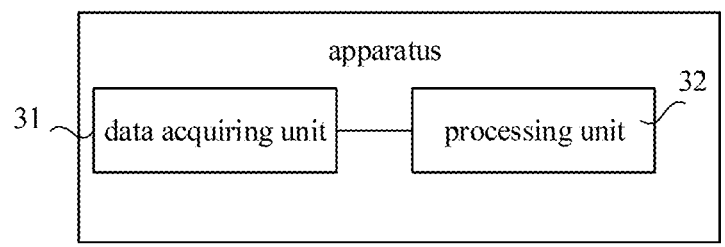
FIG. 2 shows a first structural block diagram of an apparatus for determining output information according to an embodiment of the present application.

In an embodiment, FIG. 2 shows the first structural block diagram of an apparatus for determining output information according to an embodiment of the present application, including:

a data acquiring unit 31, configured to acquire at least one history behavior of a user after a first content is output, based on history behavior data of the user;

a processing unit 32, configured to determine a behavior habit of the user after the first content is output, based on the at least one history behavior of the user, and determine output information for the user in response to the output of the first content, based on the behavior habit of the user.

Here, the solution provided by this embodiment can be applied to a device having a processing function, for example, can be applied to a server on the network side; of course, it can also be applied to a terminal device.

The history behavior data can include play history records of a plurality of users. In this embodiment, the processing can be performed separately for each of the users. Therefore, it can be understood that, in the embodiment, the processing is mainly for any one of the plurality of users.

In addition, the history behavior data can specifically be a history play time, a name, a type, a completeness of a history output content of each of the plurality of users, and the like, which are not specifically defined in this embodiment. Among them, the name of and/or the type of the history output content can be taken as a history behavior.

The processing unit 32 is further configured to determine the behavior habit of the user after the first content is output, based on a first history behavior of the at least one history behavior, wherein the first history behavior meets a preset condition, and wherein the preset condition characterizes a history behavior of the user with a play frequency equal to or larger than a preset threshold value.

Specifically, the preset condition can be for a period of time or different periods of time in a plurality of stages.

A period of time can be 7 days, or 1 day; different periods of time in a plurality of stages can be 1 day in the first stage, and 7 days in the second stage.

If a preset condition is for a period of time, a preset threshold value can be set for a period of time. A play frequency can be set as a preset threshold value, for example, the play frequency of 5 times within 7 days is set as the preset threshold value.

If the preset condition is for different periods of time in a plurality of stages, different preset threshold values can be set for different periods of time. For example, a period of time corresponding to the first stage may be shorter, 3 days, and the play frequency of 2 times within 3 days is set as the first preset threshold value; the period of time corresponding to the second stage may be longer, 10 days, and the play frequency of 7 times within 10 days is set as the second preset threshold value.

It should be understood that when the preset condition is for multiple stages, respective preset threshold values can be set according to actual conditions, but they are not listed exhaustively in this embodiment.

The aforementioned first history behavior can be understood as a history behavior meeting a preset condition among a plurality of history behaviors.

For example, the plurality of history behaviors are names of a plurality of history output contents, in which history output content 1 and history output content 2 meet the preset condition, a history output content with the highest play frequency is chosen as the first history behavior.

Alternatively, the plurality of history behaviors are types of a plurality of history output contents, in which types 1 and 2 of the history output contents meet the preset condition, a type of a history output content with the highest play frequency is chosen as the first history behavior. For example, after the first content is output, when two types of history behaviors, such as audio novels and music, meet the preset condition, the one with the highest play frequency is chosen as the first history behavior.

In addition, a behavior habit can be determined by: directly setting the first history behavior as the behavior habit of the user after the first content is output. For example, if the first history behavior is playing an audio novel, then the first history behavior can be directly set as the behavior habit of the user after the first content is output.

Alternatively, the type corresponding to the first history behavior is taken as a behavior habit of the user after the first content is output. For example, if the first history behavior is a jazz song, then music such as jazz can be used as a user's behavior habit.

The processing unit 32 determines a type or name of a content as the output information, according to the user's behavior habit.

That is, based on the type or name of the play content in the first history behavior, output information is determined.

For example, if the first history behavior is playing an audio novel, then the audio novel can be determined as output information.

If the first history behavior is playing a piano piece, then the output information can be classical music or just piano music.

Furthermore, after determining output information for the user, the processing unit 32 is configured to generate first inquiry information, based on the output information, wherein the first inquiry information indicates whether the user allows the output information to be played as a fixed play content after the first content is output.

Figure 3:
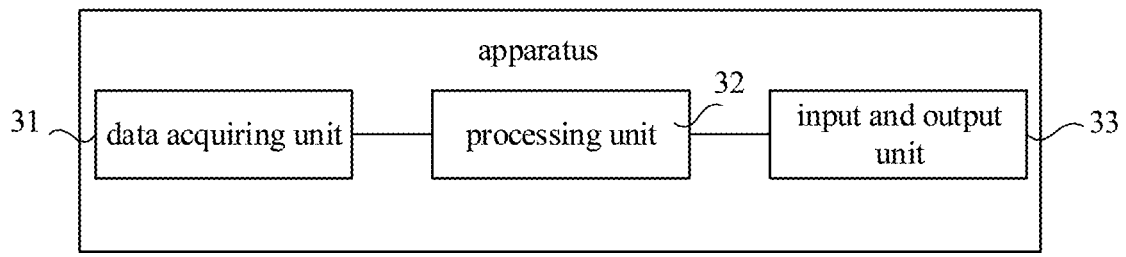
FIG. 3 shows a second structural block diagram of an apparatus for determining output information according to an embodiment of the present application.
Figure 4:
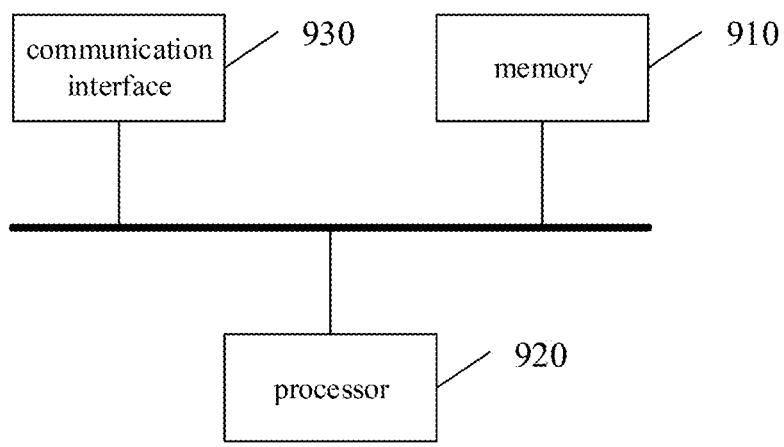
FIG. 4 shows a third structural block diagram of an apparatus for determining output information according to an embodiment of the present application.

On the basis of FIG. 3, as shown in FIG. 4, the apparatus further includes:

an input and output unit 33, configured to play the first inquiry information in response to a detected output of the first content, and receive a feedback information for the first inquiry information, wherein the processing unit 32 is configured to play the fixed play content, in response to the feedback information indicating that the user allows the output information to be played as the fixed play content after the first content is output.

That is to say, the first inquiry information is generated and is also associated with the user's behavior habit. When the determined fixed play content is the content that the user normally requests after the first content is output, and the first content is output again, the first inquiry information is played.

Further, when receiving the feedback information for the first inquiry information, if the user allows the output information to be played as the fixed play content after the first content is output, the first inquiry information will not be played next time. The output information will be directly played after the first content is output, that is, it will be played as a fixed listening habit for the user.

If the user does not allow the output information to be played as the fixed play content after the first content is output, the fixed play content will not be played and only the first content is output for the user.

Furthermore, if the user does not allow the output information to be played as the fixed play content after the first content is output, the inquiry information corresponding to the output information is deleted, that is to say, within a certain period of time, even if it is detected that the user has requested the fixed play content corresponding to the output information multiple times after the first content is output, playing the fixed play content after the first content is output will not be taken as a behavior habit again for upgrade of the output.

A period of time can be set according to the actual situation, for example, playing the fixed play content after the first content is output will not be taken as a behavior habit for subsequent processing within 10 or 30 days.

In addition, as previously described, upgrade of the output can be performed in multiple stages, that is to say, multiple behavior habits of the user can be obtained in different stages, and different behavior habits may correspond to different output informations. For example, the output information obtained in the first stage is content A; the output information obtained in the second stage is content B. After the first content is output, the content to be played may be: content A+content B.

Here, it should also be noted that the number of pieces of output information may or may not be associated with the number of periods of time.

For example, the associated situation is to avoid the disturbance to the user at night. For example, between 10 PM-8 AM, the number of pieces of output information to be recommended for the user is limited. For example, the first content is a sleeping reminder, then the number of pieces of output information can be limited to no more than two.

When the apparatus is a server, the input and output unit may be a unit capable of establishing a connection with a terminal device, to output the first query information to the user through the speaker of the terminal device, so as to obtain feedback information for the first query information through the connection with the terminal device. When the apparatus is a terminal device, the input and output unit may be a speaker of the terminal device and an audio collector (such as a microphone), which is not described in detail here.

It can be seen that, by adopting the above solution, the user's behavior habit can be obtained by analyzing the user's history behavior data, and then the output information for the user is determined according to the user's behavior habit. In this way, different behavior habits corresponding to different users can be obtained, and personalized output information can be established for the users, so that the users' listening is more in line with their own requirements, and the user experience is improved.

FIG. 4 shows the third structural block diagram of an apparatus for determining output information according to an embodiment of the present application, the apparatus includes: a memory 910 and a processor 920. The memory 910 stores a computer program executable on the processor 920. When the processor 920 executes the computer program, the method in the foregoing embodiment is implemented. The number of the memory 910 and the processor 920 may be one or more.

The apparatus further includes a communication interface 930 configured to communicate with external devices and exchange data.

The memory 910 may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other through a bus and communicate with one another. The bus may be an Industry Standard Architecture (ISA) bus, a Peripheral Component Interconnect (PCI) bus, an Extended Industry Standard Component (EISA) bus, or the like. The bus may be divided into an address bus, a data bus, a control bus, and the like. For ease of illustration, only one bold line is shown in FIG. 4, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

According to an embodiment of the present application, a computer-readable storage medium is provided for storing computer programs. When executed by the processor, the programs implement any of the methods according to above embodiments.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly restricted otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or device (such as a computer-based system, a processor-included system, or other system that fetch instructions from an instruction execution system, device, or device and execute the instructions). For the purposes of this specification, a "computer-readable medium" may be any device that may contain, store, communicate, propagate, or transport the program for use by or in connection with the instruction execution system, apparatus, or device. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method, being applied to a device having a processing function, for determining output information, comprising:
    outputting by a server or terminal device a first content, wherein the first content comprises at least one of audio, video, inquiry information, presented information, or clock alarm;
    acquiring, by the server or terminal device, at least one history output content of a user subsequent to the first content is output, based on history behavior data of the user;
    outputting in a predetermined period the at least one history output content subsequent to the first content;
    determining, by the server or terminal device, based on a name of and/or a type of the history output content subsequent to the first content being output, a second content with the name of and/or the type as a fixed output information for the user in response to the output of the first content;
    determining, by the server or terminal device, a behavior habit of the user after the first content is output, based on the at least one history behavior of the user, wherein:
    determining, by the server or terminal device, if the at least one history behavior of the user meets a preset condition, the preset condition characterizes at least one of:
    a play frequency in a period of time being equal to or larger than a preset threshold value, in a case where if multiple ones of the at least one history behavior of the user meets the preset condition, selecting a first history behavior of the user over a second history behavior of the user due to the first history behavior of the user having a higher play frequency than the second history behavior of the user; and
    the play frequencies in different periods of time in the plurality of stages being equal to or larger than the corresponding preset threshold values thereof.

2. The method according to claim 1, wherein after the determining output information for the user, the method further comprises:
    generating first inquiry information, based on the output information,
    wherein the first inquiry information indicates whether the user allows the output information to be played as a fixed play content after the first content is output.

3. The method according to claim 2, further comprising:
    playing the first inquiry information in response to a detected output of the first content;
    receiving feedback information for the first inquiry information; and
    playing the fixed play content, in response to the feedback information indicating that the user allows the output information to be played as the fixed play content after the first content is output.

4. An apparatus, with electronic device having a processing function, for determining output information, comprising:
    one or more processors; and
    a storage device configured to store one or more programs, wherein
    the one or more programs, when executed by the one or more processors, cause the one or more processors to:
    output by a server or terminal device a first content, wherein the first content comprises at least one of audio, video, inquiry information, presented information, or clock alarm;
    acquire at least one history output content of a user subsequent to the first content is output, based on history behavior data of the user;
    output in a predetermined period the at least one history output content subsequent to the first content;
    determine, by a processor of the electronic device, based on a name of and/or a type of the history output content subsequent to the first content being output, a second content with the name of and/or the type as a fixed output information for the user in response to the output of the first content;
    determine, by a processor of the electronic device, a behavior habit of the user after the first content is output, based on the at least one history behavior of the user, wherein:
    determine, by a processor of the electronic device, if the at least one history behavior of the user meets a preset condition, the preset condition characterizes at least one of:
    a play frequency in a period of time being equal to or larger than a preset threshold value, in a case where if multiple ones of the at least one history behavior of the user meets the preset condition, selecting a first history behavior of the user over a second history behavior of the user due to the first history behavior of the user having a higher play frequency than the second history behavior of the user; and
    the play frequencies in different periods of time in the plurality of stages being equal to or larger than the corresponding preset threshold values thereof.

5. The apparatus according to claim 4, wherein the one or more programs, when executed by the one or more processors, cause the one or more processors further to:
    generate first inquiry information, based on the output information,
    wherein the first inquiry information indicates whether the user allows the output information to be played as a fixed play content after the first content is output.

6. The apparatus according to claim 5, wherein the one or more programs, when executed by the one or more processors, cause the one or more processors further to:
    play the first inquiry information in response to a detected output of the first content;
    receive feedback information for the first inquiry information; and play the fixed play content, in response to the feedback information indicating that the user allows the output information to be played as the fixed play content after the first content is output.

7. A non-transitory computer-readable storage medium comprising computer executable instructions stored thereon, wherein the executable instructions, when executed by a processor, causes the processor to implement the method of claim 1.

\* \* \* \* \*